United States Patent [19]

Wanner, Sr., deceased et al.

[11] E Patent Number: Re. 33,135

[45] Reissued Date of Patent: Dec. 26, 1989

[54] PUMP APPARATUS

[75] Inventors: William F. Wanner, Sr., deceased, late of Minneapolis; William F. Wanner, Jr., trustee, Excelsior, both of Minn.

[73] Assignee: Recovery Engineering, Minneapolis, Minn.

[21] Appl. No.: 84,424

[22] Filed: Aug. 10, 1987

Related U.S. Patent Documents

Reissue of:

[64] Patent No.: 4,534,713
Issued: Aug. 13, 1985
Appl. No.: 639,911
Filed: Aug. 10, 1984

[51] Int. Cl.[4] ..... F04B 17/00

[52] U.S. Cl. ..... 417/377; 210/416.3; 417/392

[58] Field of Search ..... 210/416.1, 416.3, 652; 417/377, 392; 91/299, 317

[56] References Cited

U.S. PATENT DOCUMENTS

| | | | |
|---|---|---|---|
| Re. 32,144 | 5/1986 | Keefer | 210/416.1 X |
| 303,703 | 8/1884 | Carricaburu | 91/317 |
| 1,484,678 | 2/1924 | Slater | 91/299 X |
| 3,365,061 | 3/1978 | Bray . | |
| 3,558,242 | 1/1971 | Jenkyn-Thomas | 417/374 |
| 3,791,768 | 2/1974 | Wanner | 417/393 |
| 3,825,122 | 7/1974 | Taylor | 417/404 X |
| 4,077,883 | 3/1978 | Bray | 210/321.1 |
| 4,124,488 | 11/1978 | Wilson | 417/465 |
| 4,187,173 | 2/1980 | Keefer | 210/652 |
| 4,288,326 | 9/1981 | Keefer | 210/416.1 X |
| 4,432,876 | 2/1984 | Keefer | 210/416.1 X |
| 4,632,754 | 12/1986 | Wood | 210/416.1 X |

OTHER PUBLICATIONS

Flyer Entitled, "Survive", Aquasure Ltd., 7 York Street, East Markham, Nr. Newark, Notts. NG22 0QW, U.K.

Brochure, "Seagold 12 Volt Desalinator", Seagold Industries Corporation, 4008 Myrtle Street, Burnaby, B.C. V5C 4G2, Canada.

Brochure, "Seagold Manual Desalinator", Seagold Industries Corporation, 4008 Myrtle Street, Burnaby, B.C., Canada V5C 4G2.

*Primary Examiner*—Leonard E. Smith

*Attorney, Agent, or Firm*—Merchant, Gould, Smith, Edell, Welter & Schmidt

[57] ABSTRACT

The present invention is directed to pump apparatus for purifying water. The apparatus includes a housing containing a reciprocating plunger pump with a permanently attached filtering module preferably containing a reverse osmosis element. A manifold with a hydraulic actuated shuttle which serves as the spool for a three way valve is attached to the pump housing. The valve provides alternate pressurization and exhaust for the rod side of the piston. The pump may be operated by a hand lever or by power mechanism.

11 Claims, 4 Drawing Sheets

10
12
14
16
18
20
22
26
28
30
32
34
35
36
38
40
44
90
92
118
120
122
154
4
5

PUMP APPARATUS

Matter enclosed in heavy brackets [ ] appears in the original patent but forms no part of this reissue specification; matter printed in italics indicates the additions made by reissue.

FIELD OF THE INVENTION

The present invention is directed to a pump apparatus and, more particularly, to a pump apparatus for filtering a liquid, preferably by reverse osmosis.

BACKGROUND OF THE INVENTION

Osmosis is a natural phenomenon whereby a solution containing low solids passes through a semi-permeable membrane into a solution having greater solids concentration. Osmotic flow ceases and reaches equilibrium when the pressure in the higher solids solution equals the osmotic pressure for the membrane. Reverse osmosis occurs when a pressure greater than the osmotic pressure forces water molecules through the semi-permeable membrane in the reverse direction.

Reverse osmosis devices are known for making potable water from sea or poluted water. The conventional reverse osmosis system consists of a pump, a reverse osmosis module and a back pressure valve. The pump supplies water to the module. The semi-permeable membrane of the module element converts 10 to 20 percent of the unpurified solution to potable water. The remaining 80 to 90 percent of the solution passes to the pressure valve, which is set to maintain a pressure in the module somewhat greater than the osmotic pressure of the overflow solution. From the back pressure valve, the solution goes to waste.

Thus, generally, the energy in overflow solution from a conventional system is lost. A number of devices, however, are known for recovering that energy. In a classic device the overflow solution impinges on a Pelton wheel attached to the pump or the pump drive motor.

Other energy recovery devices are of the energy exchange type where the energy in the overflow solution is transferred to a new solution. Generally, these devices, as in U.S. Pat. No. 3,791,768, use opposed cylinder piston pumps in which the pistons are driven by the overflow concentrate of a reverse osmosis module. The energy required to pump the portion of new solution, equal in volume to the permeated or purified water, and to overcome the friction in the system, is supplied by a mechanically-driven, auxiliary pump.

Other energy exchange devices employ a single reciprocating plunger. A recent such device is shown in U.S. Pat. No. 4,187,173. In that device, a hand lever is used for the power assist. The device includes a spool-type, three-way valve, the stem of which protrudes from the housing and is parallel with the plunger rod and is attached to the hand lever. In the downstroke, the valve stem attachment to the hand lever is the fulcrum. When the stroke of the lever reverses, the fulcrum shifts from the valve stem to the plunger rod. The plunger rod remains stationary in order to serve as the new fulcrum because of a hydraulic lock on the system.

Although useful, the device of U.S. Pat. No. 4,187,173 has a number of drawbacks. For example, during startup the hydraulic lock does not exist and priming is difficult. In addition, seals to the atmosphere are required at both ends of the valve spool thereby leading to potential for leaks and failure. Most significantly, however, is that the stroke loss due to the shifting of the three-way valve and the stroke loss due to the limited angle through which the lever may be effectively manipulated results in a larger and heavier pumping unit than should be the case and than is acceptable for many uses.

SUMMARY OF THE INVENTION

An important object of this invention is to provide a reciprocating plunger pump capable of circulating a large volume of unpurified solution through a reverse osmosis module with an energy input only slightly more than that required to pump the product purified water at the overambient osmotic pressure.

Another important object of the invention is to provide a pump that can be driven mechanically or by hand lever by simply applying force to the plunger rod.

Yet another object is to incorporate a hydraulic actuated, three-way valve that opens fully inlet and vent ports resulting in minimum pressure drop at the ports.

Still another object is to minimize stroke loss due to shifting the three-way valve.

A further object is to provide a button on the protruding stem, connected to the shuttle of the three-way valve, that can be depressed during start up to hold the vent open to the driving chamber on the rod side of the plunger thereby allowing the reverse osmosis module to fill with solution at a rapid rate while compressing air in the module to make it a very effective accumulator to maintain pressure in the module during suction strokes.

To this end, the apparatus of the present invention includes a pump housing to which a cylindrical canister for a reverse osmosis element is attached. The pump housing has a three-step bore to receive the body, the fresh water tube and the overflow tube of the reverse osmosis element. Opposite the three-step bore, the pump housing has a cylindrical bore for receiving the plunger and rod, with the rod extending through a cylinder cap. The closed end of the cylinder bore has a pair of counter bores to take the inlet and outlet valve assemblies, respectively. A passage is provided between the outlet valve bore and the outer bore for the reverse osmosis element.

A manifold is attached to one side of the pump housing. The manifold has openings at one end for unpurified solution inlet and unpurified concentrate outlet. The manifold has an opening at an opposite end for fresh water outlet. A passage is provided in the manifold to connect the inlet opening with the inlet valve of the pump cylinder. The manifold has an other passage to connect the fresh water tube of the reverse osmosis element with the fresh water opening. In addition, the manifold has a cylindrical bore to receive a shuttle having a stem that passes through a plug at the open end of the bore. The ends of the bore are in fluid communication with opposite ends of the pump cylinder. The shuttle serves as a spool to create a three-way spool valve. The closed end of the shuttle bore or a button on the shuttle stem and a projection on the bore plug serve as stops to limit movement of the shuttle. The ratio of the shuttle stem diameter to the main shuttle diameter should be the same as the ratio of the plunger rod diameter to the plunger diameter so that the volume of solution in the plunger cylinder combined with that in the valve bore on either side of the shuttle remains constant during any shift of the shuttle from stop to stop. This allows the pump stroke to be reversed at any point and to be reversed smoothly. Because the diameter of the shuttle is small compared to the diameter of the plunger, very small movement of the plunger causes the shuttle to shift. Consequently, very little pump stroke is lost in shifting the three-way valve.

A central land on the shuttle has an axial length a little more than three times the width of a center port which is in fluid communication with the rod of the cylinder. Shuttle travel is limited by stops while shifting the land to either side of the center port. The shuttle has a reduced main diameter between the central land and packing lands at opposite ends of the shuttle. The axial length of the reduced diameter portions are such that the pressure port on one side of the central land which is in fluid communication with pressurized concentrate from the reverse osmosis element and the vent port on the other side of the central land which communicates with the waste port of the device are both open to respective cavities formed by the reduced diameter portions of the shuttle regardless of location of the shuttle with respect to the stops and the center port.

Thus, on a pressure stroke of the plunger, the shuttle is shifted to a position directing pressurized concentrate to the driving chamber or the rod side of the plunger. As a result of the shuttle stem being resisted only by atmospheric pressure, the shuttle moves all the way to the bottom stop, opening the central port fully. On the suction stroke of the piston, the shuttle is shifted to a position allowing the solution in the driving chamber to evacuate. As a result of the pressure differential across the shuttle created by the sudden acceleration in the inlet water system the instant the central port cracks open, the shuttle moves all the way to the top stop, again opening the center port fully. Until the indicated instant, new solution is not drawn into the pumping chamber due to the constant volumes on opposite sides of the shuttle.

It is noted that either a mechanical, power driven, reciprocating mechanism or a hand lever may be used to drive the plunger rod of the present pump.

Thus, each of the objects of the present invention are accomplished. Furthermore, the objects are particularly advantageous with respect to function and lead to structure unknown in the art. Although the advantages and objects have been pointed out, however, they are further explained and may be better understood by reference to the following drawings wherein a preferred embodiment is illustrated and thereafter described in detail.

DETAILED DESCRIPTION OF THE INVENTION

Figures 1, 2, 3:
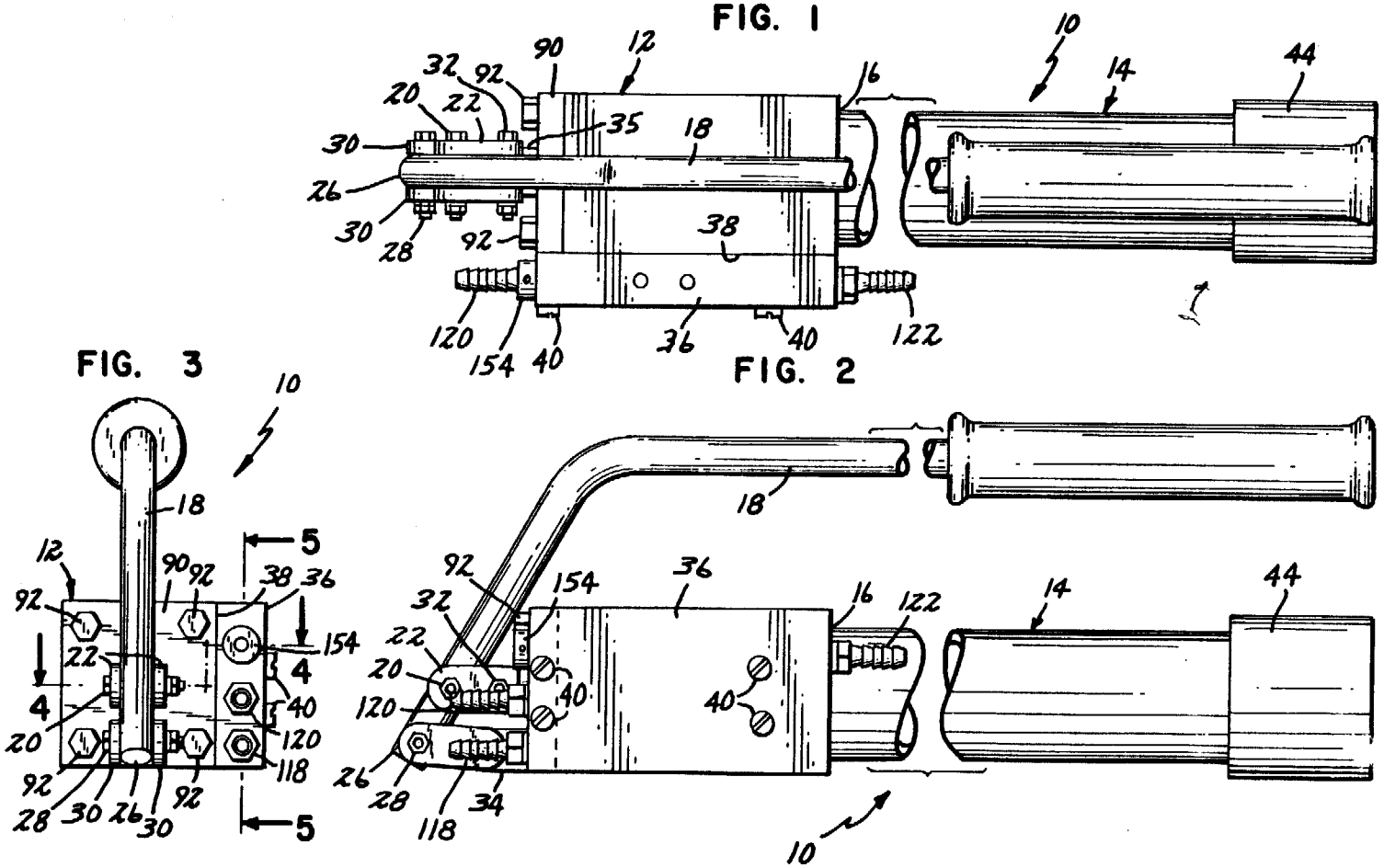
FIG. 1 is a top view of pump apparatus in accordance with the preferred embodiment of the present invention.
FIG. 2 is a side elevational view of the apparatus of FIG. 1.
FIG. 3 is a top end view of the apparatus of FIG. 1.

Referring now to the drawings wherein like reference numerals designate identical or corresponding parts throughout the several views, and more particularly to FIGS. 1–3, a pumping apparatus in accordance with the present invention is designated generally as 10. Apparatus 10 includes a housing 12 with a cylindrical tube 14 attached at a bottom end 16. A hand lever 18 is pivotally connected at end 26 by nut and bolt combination 28 to one end of a set of links 30 which are pivotally connected at the other ends to a bracket portion 34 of a cylinder cap 90 that is secured to the housing 12 by cap screws 92. At a spaced distance from links 30, lever 18 is attached to yoke 22 with nut and bolt combination 20 and with nut and bolt combination 32 to plunger rod 35. Yoke 22 pivots at 20 while links 30 pivot at both 28 and the lever attachment to bracket portion 34. A manifold 36 is attached to side 38 of housing 12 with a plurality of machine screws 40. Although it iss preferable that manifold 36 be separate and attached to housing 12, it is understood that the two elements could be an integral unit.

Figure 4:
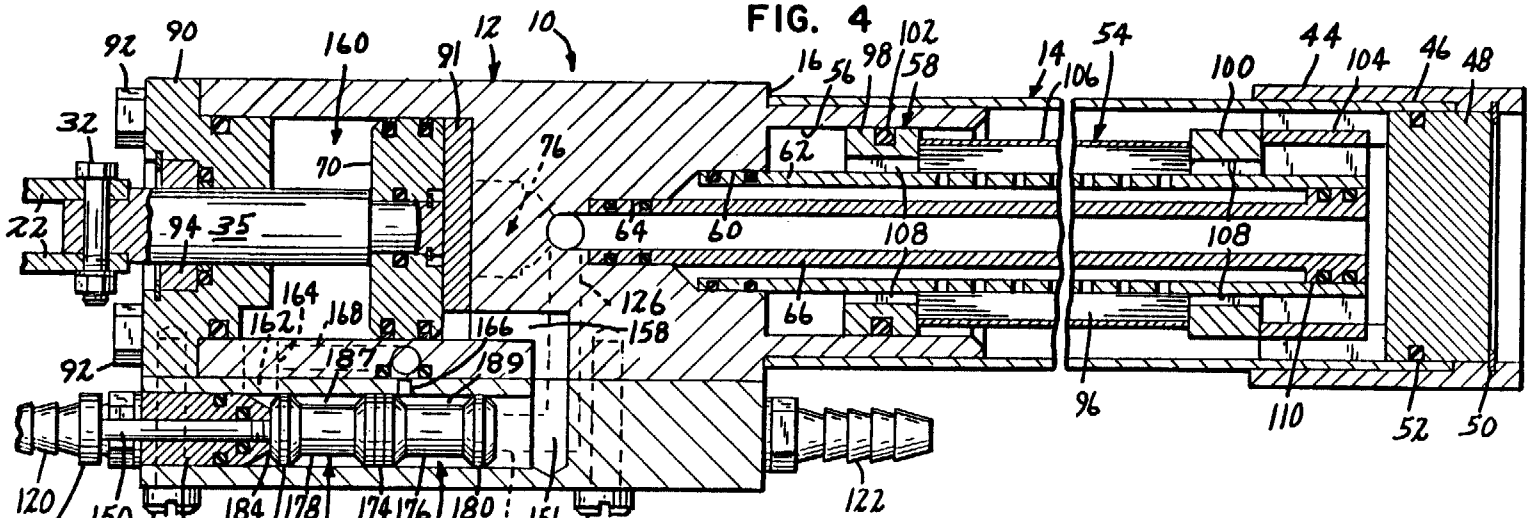
FIG. 4 is a cross-sectional view taken along line 4—4 of FIG. 3.
Figure 5:
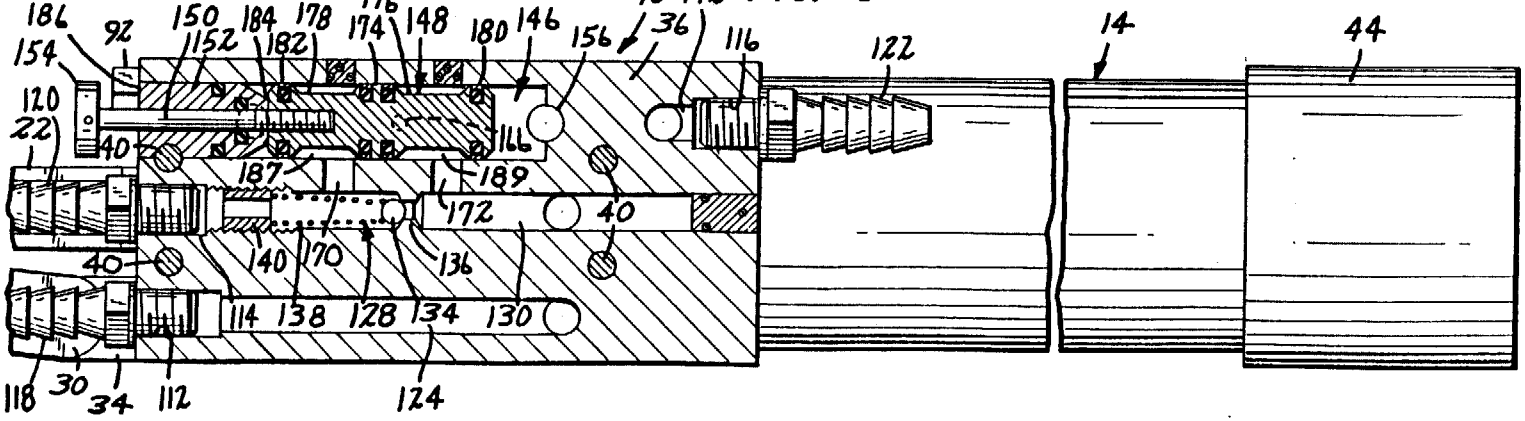
FIG. 5 is a cross-sectional view taken along line 5—5 of FIG. 3.
Figure 6:
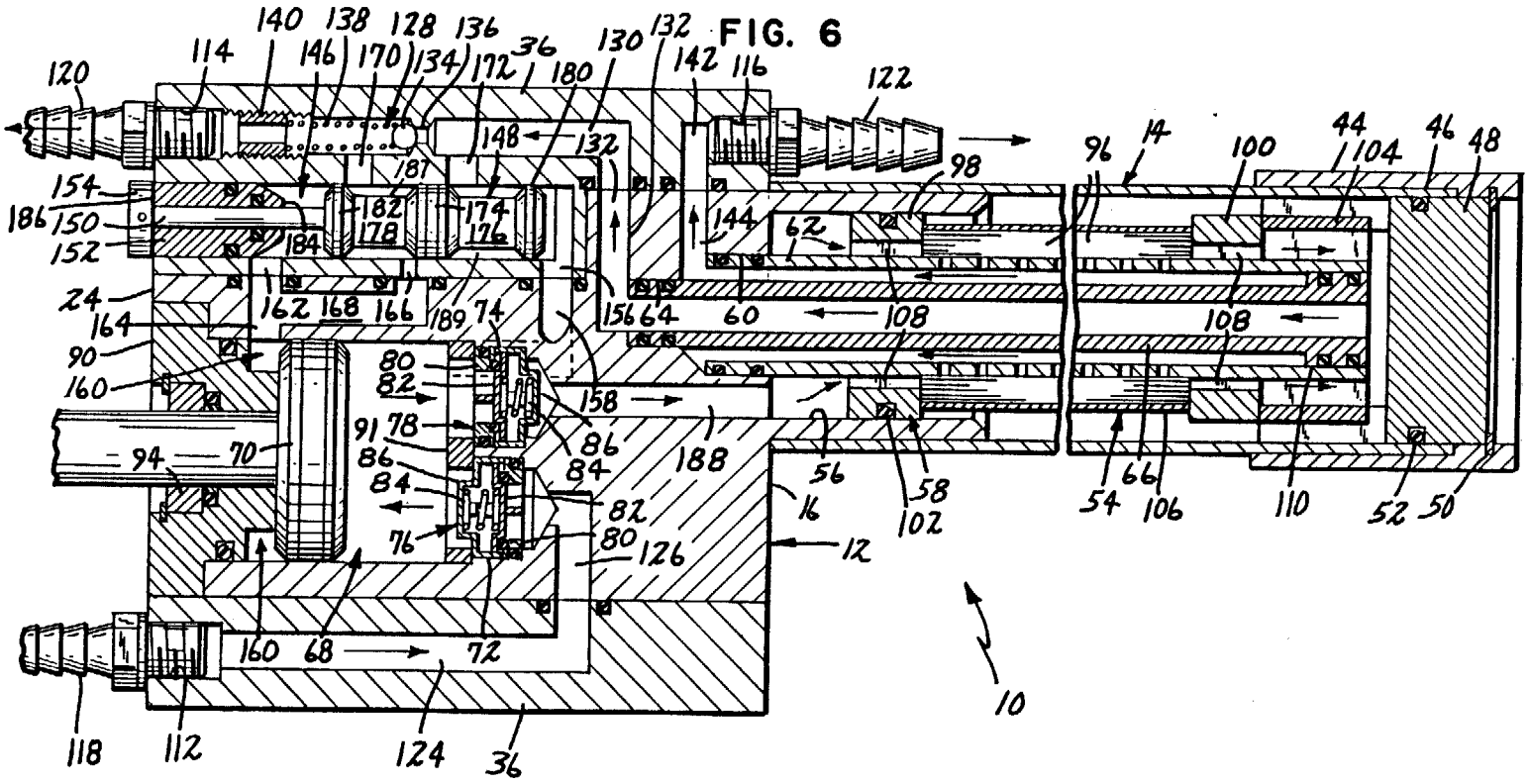
FIG. 6 is a composite view in section showing the functional relationship of the various elements.

Housing 12 is preferably made from square bar stock and machined appropriately. Cylindrical tube 14 is permanently attached to housing 12 by weld or other conventional attachment mechanism. As shown in FIGS. 4 and 6, a ferrule 44 is permanently attached to the bottom end portion 46 of tube 14 by weld or other conventional attachment mechanism. A plug 48 (see FIG. 4) fits within the end of tube 14 and ferrule 44 and is held in place with a snap ring 50. An O-ring 52 or other similar mechanism provides a pressure seal between plug 48 and cylinder 14.

A three step bore in bottom end 16 of housing 12 is designed to receive filter element 54, preferably a reverse osmosis element. Outer step 56 receives body 58 of element 54. Intermediate step 60 receives fresh water tube 62 of element 54. Inner step 64 receives overflow concentrate tube 66 of element 54.

Top end 24 of housing 12 has a bore for forming a pumping cylinder 68 for plunger 70. Plunger 70 separates cylinder 68 into a pumping chamber on the valve side of the plunger and a driving chamber on the rod side of the plunger. As indicated hereinbefore, rod 35 is attached to plunger 70, the combination of which is reciprocated, as shown in FIGS. 1–3, by hand lever 18 about fulcrum 28. The bottom end of cylinder 68 has a pair of counterbores 72 and 74, as shown most clearly in FIG. 6, which receive intake and exhaust valve assemblies 76 and 78. Each valve assembly 76 and 78 includes a seat 80, a poppet 82, a valve spring 84 and a spring retainer 86 assembled together in a conventional fashion. A plate 91 held with screws (not shown) hold valve assembles 76, 78 in place. Rod 35 passes through a cylinder cap 90 (which is held in place by cap screws 92) and an appropriate seal assembly 94 dynamically seals rod 35 with respect to cap 90.

A number of reverse osmosis elements are commercially available, and the present invention is not directed to any particular type. A typical reverse osmosis element 54, however, includes a semi-permeable membrane 96 wrapped about fresh water tube 62. Body 58 has end members 98 and 100 at either end of membrane 96. End member 98 fits snugly and is sealed at U-cup 102 to outer step 56. An end spacer member 104 has a plurality of vanes extending outwardly and downwardly to provide a snug fit for the bottom end of element 54 with cylinder 42 and cap 48. An impermeable retaining sleeve 106 encircles membrane 96 to keep it in place. End members 98 and 100 are spaced from fresh water tube 62 with a plurality of legs 108. Overflow concentrate tube 66 is spaced apart from fresh water tube 62 by the different diameter bores of intermediate step 60 and inner step 64 at one end and an enlarged diameter portion 110 of concentrate tube 66 at the other end. Water passes through membrane 96 to enter fresh water tube 62. Water which passes through legs 108 of end member 98 and along membrane 96 flows to concentrate tube 66.

In addition, although a typical reverse osmosis element has been described with respect to the preferred embodiment, it is understood that the present invention is equally applicable for other typess of filtration to the full extent of the claims.

Manifold 36 is preferably made of rectangular cross-section bar stock. Manifold 36 has three tapped openings 112, 114, and 116 for receiving hose fittings [11] *118*, 120, and 122. Opening 112 is the seawater or polluted water or unpurified water inlet. Opening 112 communicates with intake valve 76 through passagee 124 in manifold 36 and passage 126 in housing 12. Opening 114 is the waste port. Opening 114 is in fluid communication with vent port 170 of bore 146 and also is in fluid communication with adjustable relief valve 128. Relief valve 128 is conventional and includes ball 134 held against restriction 136 by spring 138 retained by threaded bushing 140. Opening 116 is the fresh water outlet. Opening 116 is in fluid communication with fresh water tube 62 through passage 142 in manifold 36 and passage 144 in housing 12.

Manifold 36 also has a cylindrical bore 146 forming a chamber that takes a shuttle 148 with an attached stem 150 that passes through a plug 152 in the open end of the bore. At its outer end, stem 150 is fitted with a button 154. The closed end of bore 146 is in fluid communication with the closed end of cylinder 68 through first end port 156 in manifold 36 and passage 158 in housing 12. The end of bore 146 next to plug 152 is in fluid communication with the rod side of piston 70 through second end port 162 in manifold 36 and passage 164 in housing 12. A center port 166 in bore 146 communicates through passage 168 in housing 12 with passage 164 to chamber 160 on the rod side of plunger 70. A vent port 170 connects cavity 187, defined as the annular space between the reduced diameter portion 178 of shuttle 148 and the wall of bore 146 with waste or outlet port 114. A pressure port 172 connects cavity 189, defined as the annular space between the reduced diameter portion 176 of shuttle 148 and the wall of bore 146 with the passage 130 which is in fluid communication with the concentrate side of element 54 by means of passage 132. Relief valve 128 is disposed between passage 132 and opening 114.

Shuttle 148 has a center land 174, the length of which is slightly more than three times the width of center port 166. Shuttle 148 has reduced diameter portions 176 and 178 on opposite sides of center land 174. Reduced diameter portion 176 extends between center land 174 and a packing land 180 at the bottom end of shuttle 148. Reduced diameter portion 178 extends between center land 174 and packing land 182 at the top end of shuttle 148 for internal attachment with stem 150. The length of reduced diameter portions 176 and 178 are such that the cavities formed between them and the wall of bore 146 are always open to pressure port 172 and vent port 170, respectively, regardless of the position of shuttle 148. Shuttle 148 moves from an uppermost location wherein the lower end 184 of plug 152 forms a stop for land 182 to a lowermost position wherein the upper end 186 of plug 152 forms a second stop with button 154 making the contact. Alternatively, button 150 may be spaced from end 186 with the inner end of bore 146 functioning as the second stop.

It is understood that various static and dynamic seals are needed throughout apparatus 10. Such seals are conventional. For example, the packings on shuttle 146 and piston 70 are fluorocarbon rings backed up with O-rings. The seals on rod 35 are double lipped type seals. A U-cup is preferred for sealing element 54 to housing 12. The various static seals are O-rings.

Figure 7:
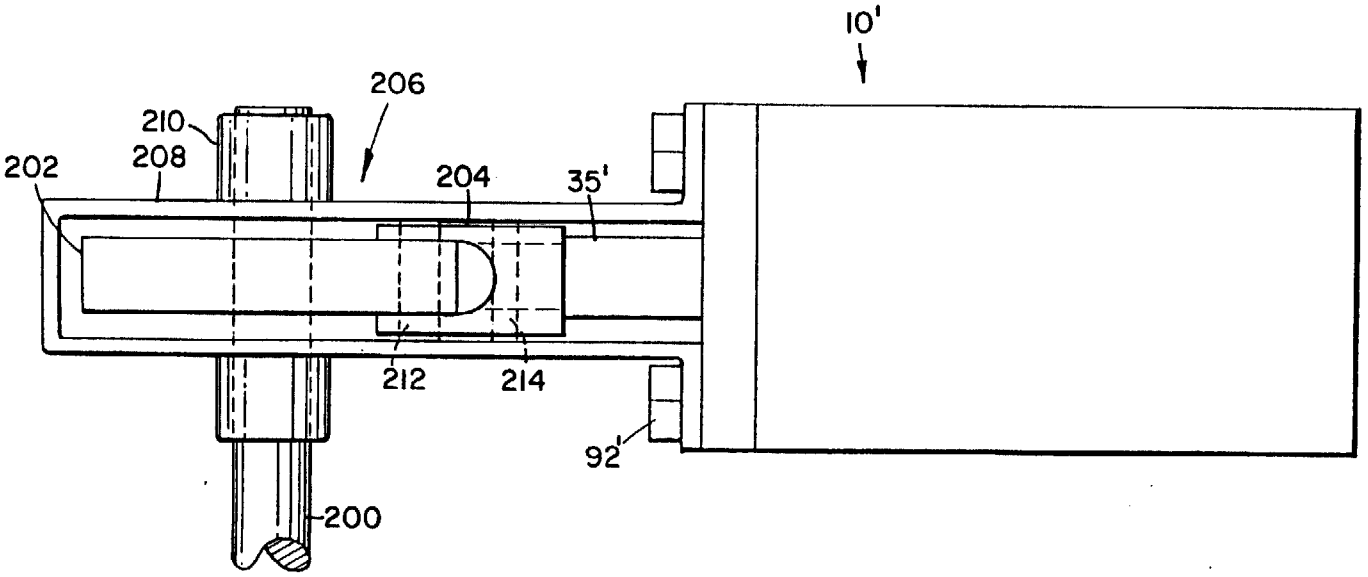
FIG. 7 is an elevational view of the pump apparatus as driven by rotary shaft.

It is further understood that, although hand lever 18 is disclosed as the preferred embodiment for driving pump apparatus 10, a mechanical drive as shown in FIG. 7 could as well be applied too rod 35. In addition, multiple cylinders and plungers and driving mechanisms could be designed to operate in conjunction with one another to function the present or multiple equivalents of the present use device.

The mechanical drive of FIG. 7 shows a rotary shaft 200 connected through a crank member 202 by link 204 to rod 34' of apparatus 10'. Bracket 206 supports shaft 200 with bearings or a bearing surface within bosses 210. Bracket 206 is attached to apparatus 10' at cap screws 92'. Bracket 206 includes a pair of spaced walls 208 having bosses 210 attached to the outer sides of each. Crank 202 is fixedly attached to shaft 200 and rotates with it. Link 204 is fastened to crank 202 pivotably with pin 212 while link 204 is fastened pivotably to rod 34' with pin 214.

It is noted that the following relationships exist between various elements of apparatus 10. The ratio of the cross sectional area of plunger rod 35 to the cross sectional area of piston 70 is the same as and determining the recovery ratio of the reverse osmosis element 54. The recovery ratio is the percentage of fresh water as compared with total water pumped per stroke. Also, the ratio of the diameter of stem 150 of shuttle 148 to the diameter of land 182 must be the same as the ratio of the diameter of plunger rod 35 to the diameter of plunger 70 to maintain a constant volume of water on opposite sides of plunger 70 and shuttle 148 during the hydraulic shifting of shuttle 148.

In operation, seawater or other impure or unpotable water is directed from a source to hose fitting 118. During an upstroke or suction stroke of plunger 70, intake valve 76 is opened and feed water is inducted through passages 124 and 126 and intake valve 76 to pumping cylinder or chamber 68. On reversal of force applied to lever 18, plunger 70 begins a pumping stroke. During the downstroke or pumping stroke, feed water is forced through outlet valve 78 and passage 188 to outer bore 56 and along legs 108 of end member 98 to membrane 96. The water continues to flow along membrane 96 and legs 108 of end member 100 to overflow concentrate tube 66 and passage 132, 130, and 172 to cavity 189, and through port 166 and passages 168 and 164 to chamber 160. It is noted that in the preferred embodiment hand lever 18 pivots about a fulcrum at nut and bolt combination 28 so as to drive plunger 70 at all times.

By applying finger pressure of about 15 psi to button 154 during the initial reciprocations of plunger 70, first air and then feed water will be drawn through intake valve 76 and forced into the system at the full displacement ratio of the plunger pump until a pressure of about 80 psi is developed. At that pressure level, the level of solution in element 54 is above concentrate output tube 66 and the air trapped in the system makes the various passages and cavities an effective accumulator. On each pumping stroke, feed fluid pressurizes in the pumping chamber and at the lower end of shuttle 148 in bore 146. On the pumping stroke that exerts enough pressure through passage 158 and port 156 to overcome the finger pressure on button 154 and shuttle 148, shuttle 148 will shift to the upper end of chamber 146 thereby closing center port 166 to vent port 170 and opening center port 166 to pressure [portt] *port* 172 to allow pressurization of driving chamber 160 during a downstroke of plunger 70. That is, impure concentrate water from tube 66 will flow through passages 132 and 130 to pressure port 172 and the cavity 189 around reduced diameter portion 176 of shuttle 148 to center port 166 and passages 168 and 164 to chamber 160. Since the pressurized water is on the back side of plunger 70, only sufficient force to develop a higher pressure than that already present in the system need be applied by hand lever 18. That is, due to the equalization of the unit pressure on both sides of plunger 70, the pressure stroke needs to provide a force on a rod 35 only slightly greater than the unit pressure times the cross sectional area of plunger rod 35.

It is noted that center port 166 opens fully because of the difference in force on the ends of shuttle 148 as a result of shuttle stem 150 passing through to atmosphere. It is also noted that a very small movement of plunger 70 shifts shuttle 148 because the cross-sectional area of shuttle 148 is only, for example, about one-tenth the area of plunger 70. In such a circumstance, the required movement of [plungwer] *plunger* 70 is about 0.031 inches for moving shuttle 148 about 0.312 inches. Therefore, only a very small portion of plunger stroke is lost in shifting the valve shuttle.

On upstrokes following the overcoming of the finger pressure on button 154, liquid in chamber 160 on [thwe] *the* rod side of plunger 70 is forced into bore 146 to shift shuttle 148 to where button 154 stops against end 186 of plug 152. Again, a very small movement of plunger 70 causes shuttle 148 to shift. During the shift, the combined volume of the liquid in the system from one side of plunger 70 and shuttle 148 to the other remains constant since the ratio of the diameter of shuttle stem 150 to the diameter of the shuttle lands is the same as the ratio of the diameters of rod 35 to plunger 70. Thus, movement of plunger 70 causes shuttle 148 to shift since the cavities at the same ends of each are in fluid communication with one another. As center land 174 moves past center port 166, the closed system including element 54 is isolated between land 174 and closed exhaust valve 78. As soon as port 166 cracks open to vent port 170 through cavity 187, water on the rod side of plunger 70 depressurizes and vents, while shuttle 148 opens fully due to the suction developed at the bottom end of the shuttle.

With repeated strokes, a volume of solution equal to the displacement of plunger rod 35 is added to the closed system with each stroke. Pressure in the system continues to build until it exceeds the osmotic pressure of membrane 96. At that point, fresh water migrates through membrane 96 into fresh water tube 62 and passages 144 and 142 to tapped port 116 for connection to a fresh water receptacle. The pressure in the closed system floats to where the fresh water produced is equal to the downstroke displacement of plunger rod 35 during each reciprocation. Adjustable relief valve functions to prevent rupturing pressures from being exerted on membrane 96 if there is a clogging of membrane 96.

Certain critical relationships for apparatus 10 have been indicated. Other features of the structure, however, could have a number of equivalents. Consequently, although details of all elements of the structure have been set forth, it is understood that the presently preferred embodiment is exemplary. Therefore, changes made, especially in matters of shape, size, arrangement, and combinations of components and assemblies, to the full extent extended by the general meaning of the terms in which the appended claims are expressed, are understood to be within the principle of the present invention.

What is claimed is:

1. Apparatus for filtering a liquid, comprising:

a pump having a reciprocable rod and plunger, said pump having a space separated into driving and pumping chambers by said plunger, said driving chamber having a first end closure, said rod extending from said plunger through said first end closure, said pump being in fluid communication with polluted liquid from a liquid source;

means, attached to said rod, for driving said pump;

means for filtering purified liquid and unfiltered concentrate liquid fractions from the polluted liquid;

first means for communicating the polluted liquid from the pumping chamber of said pump to said filtering means;

second means for communicating the purified liquid frm said filtering means to an outlet port;

third means for communicating unfiltered concer liquid from said filtering means to a vent port, said third communicating means including valve means for selectively directing concentrate liquid along one of a first path from said filtering means to the drive chamber of said pump and a second path from the drive chamber to said vent port, said valve means including a movable shuttle and stem, said valve means further having a passage in which said shuttle moves between a first position for directing the concentrate liquid along the first path and a second position for directing the concentrate liquid along the second path;

said passage having a second end closure, said stem extending from said shuttle through said second end closure, said shuttle having a stem end and an end opposite, said rod, said plunger, said stem and said shuttle having cross-sectional areas normal to directional movements so that relative displacement volumes through which said rod, said plunger, said stem and said shuttle move on opposite sides of said shuttle and on opposite sides of said plunger are the same;

third means for communicating *concentrate liquid* from said driving chamber to the stem end of the shuttle *to move said shuttle between said first and second positions*; and fourth means for communicating *polluted liquid* from said pumping chamber to the end opposite the stem of said shuttle *to move said shuttle between said first and second positions.*

2. Pump apparatus for filtering a liquid, comprising:

a housing having first and second cylinders, each of said first and second cylinders having first and second ends;

a plunger for moving in said first cylinder, said plunger having a diameter [slightly less than the diameter of said first cylinder,] said plunger dividing said first cylinder into pumping and driving chambers;

a rod attached at a first end to said plunger, said rod passing through a first wall at the second end of said first cylinder to a location external of said housing, said rod having a diameter [slightly less than the bore in first wall];

means, attached to a second end of said rod, for rreciprocating said rod and said plunger to pump polluted liquid to an over-ambient pressure level;

a use device for receiving the polluted liquid;

first means for communicating the polluted liquid from a liquid source to the pumping chamber of said first cylinder;

second means for communicating the polluted liquid from said pumping chamber to said use device, said use device rejecting a portion of the polluted liquid as concentrate liquid;

third means for communicating the concentrate liquid at said pressure level from said use device to a vent port, said third communicating means including valve means for selectively directing the concentrate liquid along one of a first path from said use device to the driving chamber of said first cylinder and a second path from the driving chamber to the vent port, said valve means including a shuttle for moving in said second cylinder between a first position for directing the concentrate liquid along the first path and a second position for directing the concentrate liquid along the second path, said shuttle having a land with a diameter [slightly less than the diameter of said second cylinder,] said valve means further including a stem attached [at a first end] to [a first end of] said shuttle, said stem having a portion retained in a passage in a second wall in the second end of said second cylinder, said stem having a diameter, [slightly less than the bore in second wall;] the ratio of the diameters of said rod to said plunger being the same as the ratio of the diameters of said stem to the land of said shuttle; and means in fluid communication with the driving and pumping chambers of said first cylinder for hydraulically moving said shuttle between the first and second positions.

3. Apparatus in accordance with claim 2 wherein said reciprocating means includes a manually operated lever attached to the second end of said rod.

4. Apparatus in accordance with claim 2 wherein said reciprocating means includes a motor and linkage means for connecting said motor and the second end of said rod.

5. Apparatus in accordance with claim 2 including a relief valve in fluid communication with said second communicating means to relieve excessive pressure due to a malfunction of said use device.

6. Apparatus in accordance with claim 2 wherein said stem attached to said shuttle passes a through the second wall in the second end of said second cylinder, said stem having a second end external of said housing whereby said shuttle may be manually held in the first position during initial pressurization of said apparatus.

7. Apparatus in accordance with claim 2 wherein said valve means includes a pressure port and the vent port in said second cylinder, said valve means further including a center port in said second cylinder for selective fluid communication with one of said pressure and vent ports, said shuttle having a center land for contacting the perimeter of said second cylinder, whereby said center land moves between opposite sides of said center port as said shuttle moves between its first and second positions thereby selectively providing fluid communication between said center port and one of said pressure and vent ports.

8. Apparatus in accordance with claim 7 wherein said valve means includes first and second packing lands on opposite sides of said center land, said valve means further including first and second end ports in said second cylinder, said first end port providing fluid communication between the pumping chamber of said first cylinder and one end of said second cylinder, said second end port providing fluid communication between the driving chamber of said first cylinder and the other end of said second cylinder.

9. A method for filtering a feed liquid into filtered liquid and concentrate liquid fractions which are respectively passed through and rejected by filter means, the filter means being exposed to pressurized feed liquid supplied by reciprocating pump means including a rod and plunger in a first cylinder and cooperating with valve means including a stem and shuttle in a second cylinder, said rod, said plunger, said stem and said shuttle being sized so that the relative displacement volumes through which said rod, said plunger, said stem and said shuttle move on opposite sides of said shuttle and on opposite sides of said plunger are the same, the plunger dividing the first cylinder into pumping and driving chambers, said pump means having intake and exhaust valves, said method comprising the steps of:

opening the intake valve of said pump means;

inducting feed fluid into the pumping chamber by an induction stroke of said pump means;

reversing direction of force applied to said pump means[; ] at any point in the induction stroke;

pressurizing feed fluid in the pumping chamber and at one end of the shuttle in the second cylinder by a pumping stroke of the plunger;

shifting said shuttle to allow fluid communication of the pressurized concentrate liquid into the driving chamber of said pump means to supplement energy supplied to the plunger during the pumping stroke;

filtering the feed fluid into a filtered liquid fraction for end use and a concentrate liquid fraction for passage to said valve means and said driving chamber;

reversing again direction of force applied to said pump means at any point in the pumping stroke which in turn reverses direction of movement of said plunger;

closing the exhaust valve of said pump means;

forcing concentrate fluid from the driving chamber to the stem end of said shuttle; and shifting said shuttle to vent concentrate liquid from the driving chamber to minimize energy needed for the induction stroke.

10. The method of claim 9 including the step of preventing shuttle shifting during a pumping stroke of said pump means.

11. Pump apparatus for purifying water by reverse osmosis, comprising:

a housing having first and second cylinders, each of said first and second cylinders having first and second ends;

a plunger for moving in said first cylinder, said plunger dividing said first cylinder into pumping and driving chambers;

a rod attached at a first end to said plunger, said rod passing through a first wall at the second end of said first cylinder to a location external of said housing;

means, attached to a second end of said rod, for reciprocating said rod and said plunger to pump polluted water at an over-ambient pressure;

an element including a reverse osmosis membrane for separating polluted water into permeated water and concentrate water fractions;

first means for communicating polluted water from a source to the pumping chamber of said first cylinder;

second means for communicating the polluted water from the pumping chamber to said reverse osmosis element;

third means for communicating concentrate water at said over-ambient pressure from said reverse osmosis element to a vent port, said third communicating means including valve means for selectively directing concentrate water along one of a first path from said reverse osmosis element to the driving chamber and a second path from the driving chamber to the vent port, said valve means including a shuttle for moving in said second cylinder between a first position for directing the concentrate liquid along the first path and a second position for directing the concentrate water along the second path, said shuttle having a stem attached at a first end to a first end of said shuttle, said stem extending through a second wall in the second end of said second cylinder to a location external of said housing, said shuttle further including a button attached to the second end of said stem for optionally holding said shuttle from moving, said valve means further including a pressure port, said vent port, and a center port in said second cylinder, said shuttle having a center land for contacting the perimeter of said second cylinder, said center land moving between opposite sides of said center port as said shuttle moves between said first and second positions to selectively provide fluid communication between said center port and one of said pressure and vent ports, said valve means still further including first and second packing lands on opposite sides of said center land, said valve means also including first and second end ports in said second cylinder, said first end port providing fluid communication between the pumping chamber of said first cylinder and the space between the first end of said second cylinder and said first land, said second end port providing fluid communication between the driving chamber of said second cylinder and the space between the second end of said second cylinder and said second land; and a relief valve in fluid communication with said second communicating means and ambient to relieve excessive pressure due to a malfunction or plugging of said reverse osmosis element.

* * * * *

UNITED STATES PATENT AND TRADEMARK OFFICE

CERTIFICATE OF CORRECTION

PATENT NO. : Re 33,135

DATED : December 26, 1989

INVENTOR(S) : William F. Wanner

It is certified that error appears in the above-identified patent and that said Letters Patent is hereby corrected as shown below:

Title page:

[73] Assignee: After "Engineering" insert--, Inc.--.

Column 1, line 25, "poluted" should be--polluted--.

Column 2, line 52, "an other" should be--another--.

Column 4, line 21, "iss" should be--is--.

Column 4, line 56, "assembles" should be--assemblies--.

Column 5, line 17, "typess" should be--types--.

Column 5, line 24, "passagee" should be--passage--.

Column 6, line 20, "too" should be--to--.

Column 8, line 35, "frm" should be--from--.

Column 8, line 36, "concer" should be--concentrate--.

UNITED STATES PATENT AND TRADEMARK OFFICE

CERTIFICATE OF CORRECTION

PATENT NO. : Re 33,135

DATED : December 26, 1989

INVENTOR(S) : William F. Wanner

It is certified that error appears in the above-identified patent and that said Letters Patent is hereby corrected as shown below:

Column 9, lines 14-15, "rrecripocating" should be --reciprocating--.

Column 9, line 64, delete "a".

Signed and Sealed this

Sixteenth Day of April, 1991

*Attest:*

*Attesting Officer*

HARRY F. MANBECK, JR.

*Commissioner of Patents and Trademarks*